(12) United States Patent
Aybay

(10) Patent No.: US 8,804,753 B2
(45) Date of Patent: Aug. 12, 2014

(54) METHODS AND APPARATUS RELATED TO A SHARED MEMORY BUFFER FOR VARIABLE-SIZED CELLS

(75) Inventor: Gunes Aybay, Los Altos, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 62 days.

(21) Appl. No.: 13/406,219

(22) Filed: Feb. 27, 2012

(65) Prior Publication Data
US 2012/0159062 A1 Jun. 21, 2012

Related U.S. Application Data

(63) Continuation of application No. 12/415,517, filed on Mar. 31, 2009, now Pat. No. 8,126,002.

(51) Int. Cl.
*H04L 12/28* (2006.01)
*H04L 12/56* (2006.01)
*H04Q 11/04* (2006.01)

(52) U.S. Cl.
CPC .............. *H04L 49/608* (2013.01); *H04L 49/90* (2013.01); *H04L 49/3072* (2013.01); *H04L 49/103* (2013.01); *H04L 45/00* (2013.01); *H04L 49/1515* (2013.01); *H04Q 11/0478* (2013.01); *H04L 49/9042* (2013.01); *H04L 47/10* (2013.01); *H04L 49/101* (2013.01); *H04L 49/252* (2013.01); *H04L 49/108* (2013.01); *H04L 49/251* (2013.01)
USPC ......................................... 370/412; 370/428

(58) Field of Classification Search
USPC ................................. 370/412, 428
See application file for complete search history.

(56) References Cited

U.S. PATENT DOCUMENTS

| | | | |
|---|---|---|---|
| 5,557,610 A | 9/1996 | Calamvokis et al. | |
| 5,926,473 A | 7/1999 | Gridley | |
| 5,991,295 A | 11/1999 | Tout et al. | |
| 6,049,546 A | 4/2000 | Ramakrishnan | |
| 6,728,254 B1 | 4/2004 | Stacey et al. | |
| 7,230,947 B1 | 6/2007 | Huber et al. | |
| 7,352,766 B2 | 4/2008 | Van Asten et al. | |
| 7,715,419 B2 * | 5/2010 | Tatar et al. | 370/419 |
| 7,764,703 B1 * | 7/2010 | Walsh et al. | 370/412 |

(Continued)

FOREIGN PATENT DOCUMENTS

| | | |
|---|---|---|
| EP | 1 237 344 A2 | 9/2002 |
| EP | 1 237 344 A3 | 6/2003 |
| WO | WO 02/15497 A1 | 2/2002 |

OTHER PUBLICATIONS

Chinese Office Action dated Jul. 18, 2012 for Chinese Application No. 201010157923.X.

(Continued)

*Primary Examiner* — Ayaz Sheikh
*Assistant Examiner* — Blanche Wong
(74) *Attorney, Agent, or Firm* — Cooley LLP

(57) ABSTRACT

In one embodiment, an apparatus includes a shared memory buffer including a lead memory bank and a write multiplexing module configured to send a leading segment from a set of segments to the lead memory bank. The set of segments includes bit values from a set of variable-sized cells. The write multiplexing module further configured to send each segment from the set of segments identified as a trailing segment to a portion of the shared memory mutually exclusive from the lead memory bank.

20 Claims, 9 Drawing Sheets

(56) References Cited

U.S. PATENT DOCUMENTS

| | | | |
|---|---|---|---|
| 7,814,280 B2 * | 10/2010 | Cummings et al. | 711/147 |
| 8,126,002 B2 * | 2/2012 | Aybay | 370/412 |
| 2002/0118692 A1 | 8/2002 | Oberman et al. | |
| 2003/0026287 A1 | 2/2003 | Mullendore et al. | |
| 2008/0080548 A1 | 4/2008 | Mullendore et al. | |
| 2010/0246275 A1 | 9/2010 | Aybay | |

OTHER PUBLICATIONS

Office Action mailed Apr. 1, 2011 for U.S. Appl. No. 12/415,517 (10 pages).

Search Report for European Application No. 10156709.7, mailed Jun. 30, 2010 (7 pages).

Office Action for Chinese Application No. 201010157923.X, dated Nov. 24, 2011 (6 pages).

* cited by examiner

METHODS AND APPARATUS RELATED TO A SHARED MEMORY BUFFER FOR VARIABLE-SIZED CELLS

CROSS REFERENCE TO RELATED APPLICATION

This application is a continuation of U.S. patent application Ser. No. 12/415,517, filed on Mar. 31, 2009, entitled "Methods and Apparatus Related to a Shared Memory Buffer for Variable-Sized Cells," which is incorporated herein by reference in its entirety.

BACKGROUND

Embodiments described herein relate generally to a buffer module, and, in particular, to methods and apparatus related to a shared memory buffer for variable-sized cells.

Known low latency shared memory buffers can be used in many types of applications. For example, low latency shared memory buffers can be used in relatively high throughput network switch applications and in parallel computing systems. These known shared memory buffers often use a cut-through approach where the shared memory buffer is configured to transmit a head end (e.g., initial bit values) of, for example, a cell before a tail end (e.g., trailing bit values) of the cell has been completely received at an input port of the shared memory buffer. These known shared memory buffers can be configured to process cells having fixed bit-wise widths and/or process segments that have bit-wise widths equal to a minimum bit-wise width of a cell. These known shared memory buffers, however, often process the cells with an undesirable level of administrative overhead and/or are not configured to process variable-sized cells in a desirable fashion.

Thus, a need exists for methods and apparatus for a shared memory buffer configured to process variable-sized cells.

SUMMARY

In one embodiment, an apparatus includes a shared memory buffer including a lead memory bank and a write multiplexing module configured to send a leading segment from a set of segments to the lead memory bank. The set of segments includes bit values from a set of variable-sized cells. The write multiplexing module further configured to send each segment from the set of segments identified as a trailing segment to a portion of the shared memory mutually exclusive from the lead memory bank.

DETAILED DESCRIPTION

Figure 1A:
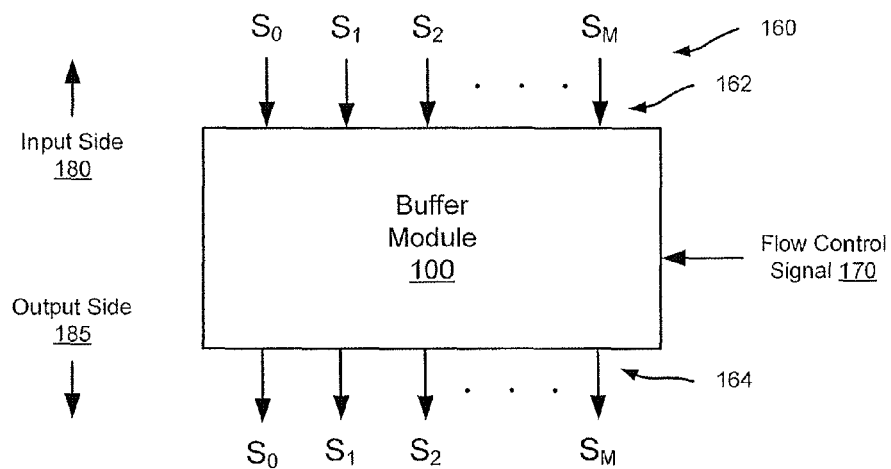
FIG. 1A is a schematic diagram that illustrates a buffer module, according to an embodiment.

A buffer module can have a shared memory buffer configured to process multiple data signals received in parallel based on one or more flow control signals. The shared memory buffer can be defined by multiple memory banks. The buffer module can be configured to modify a bit rate (also can be referred to as a flow rate) of one or more of the multiple data signals received at the buffer module based on the flow control signal(s). For example, the buffer module can be configured to delay a data signal received at the buffer module in response to a flow control signal indicating that the data signal received at the buffer module should be delayed for a specified period of time. Accordingly, one or more portions (e.g., segments) of the data signal can be held in the shared memory buffer of the buffer module for the specified period of time, and a bit rate of the data signal transmitted into the buffer module will be different than the bit rate of the data signal transmitted from the buffer module. The flow control signal can be defined in response to, for example, congestion at a downstream processing module. If the buffer module is included in a stage of a multi-stage switch fabric, the flow control signal can be received from, for example, a downstream stage of the multi-stage switch fabric. In some embodiments, the multi-stage switch fabric can define at least a portion of a core portion of a data center.

In some embodiments, each of the data signals can be referred to as a channel (also can be referred to as a data channel). In some embodiments, the data signals can be defined by one or more streams of cells (e.g., variable-sized cells and/or fixed-sized cells). In some embodiments, the cells can be defined based on bit values from one or more packets (e.g., Ethernet packets, session control protocol packets). The data signal (e.g., the stream of cells) can be processed at the buffer module as slices that can be referred to as segments. In some embodiments, the segments can have a bit-wise width that is less than a minimum bit-wise width of a variable-sized cell that can be received at the buffer module.

Data signals can be processed through the buffer module such that processing latencies through the buffer module (and shared memory buffer) are relatively small and substantially constant until a flow control signal triggering a delay is received. For example, the processing latency of a signal through the buffer module can be a few clock cycles. Accordingly, the signal will be time-shifted a few clock cycles, and the bit rate of the data signal transmitted into the buffer module will be substantially the same as the bit rate of the data signal transmitted from the buffer module. In some embodiments, the buffer module can be configured to transmit a head end (e.g., initial bit values) of, for example, a cell before a tail end (e.g., trailing bit values) of the cell has been completely received at an input port of the buffer module.

The buffer module can have a write multiplexing module configured to distribute segments of the data signals (e.g., segments of a stream of cells) in parallel to memory banks of the buffer module. This process can be referred to as distribution. The buffer module can have a read multiplexing module configured to order and send the portions of the data signals from the buffer module. This process can be referred to as reassembly. In some embodiments, the segments can be distributed by the write multiplexing module in a predefined fashion (e.g., in a predefined pattern, in accordance with a predefined algorithm) so that the segments of the data signals can be reassembled by the read multiplexing module based on the predefined fashion.

In some embodiments, one or more portions of the buffer module can be a hardware-based module (e.g., a digital signal processor (DSP), a field programmable gate array (FPGA)) and/or a software-based module (e.g., a module of computer code, a set of computer-readable instructions that can be executed at a computer). In some embodiments, one or more of the functions associated with the buffer module can be included in a single module, or divided into several modules.

FIG. 1A is a schematic diagram that illustrates a buffer module 100, according to an embodiment. As shown in FIG. 1A, data signals $S_0$ through $S_M$ are received at the buffer module 100 on an input side 180 of the buffer module 100 (e.g., through input ports 162 of the buffer module 100). After processing at the buffer module 100, the data signals $S_0$ through $S_M$ are transmitted from the buffer module 100 on an output side 185 of the buffer module 100 (e.g., through output ports 164 of the buffer module 100). Each of the data signals $S_0$ through $S_M$ can define a channel (also can be referred to as a data channel). The data signals $S_0$ through $S_M$ can collectively be referred to as data signals 160. Although the input side 180 of the buffer module 100 and the output side 185 of the buffer module 100 are shown on different physical sides of the buffer module 100, the input side 180 of the buffer module 100 and the output side 185 of the buffer module 100 are logically defined and do not preclude various physical configurations of the buffer module 100. For example, one or more of the input ports 162 and/or one or more of the output ports 164 of the buffer module 100 can be physically located at any side (and/or the same side) of the buffer module 100.

The buffer module 100 can be configured to process the data signals 160 such that processing latencies of the data signals 160 through the buffer module 100 can be relatively small and substantially constant. Accordingly, the bit rates of the data signals 160, as the data signals 160 are processed through the buffer module 100, can be substantially constant. For example, the processing latency of data signal $S_2$ through the buffer module 100 can be a substantially constant number of clock cycles. Accordingly, the data signal $S_2$ may be time-shifted by the number of clock cycles, and the bit rate of the data signal $S_2$ transmitted into the input side 180 of the buffer module 100 will be substantially the same as the bit rate of the data signal $S_2$ transmitted from the output side 185 of the buffer module 100. More details related to processing latencies at the buffer module 100 are described in connection with FIG. 1B.

The buffer module 100 can be configured to modify a bit rate of one or more of the data signals 160 in response to one or more portions of flow control signal 170. For example, the buffer module 100 can be configured to delay data signal $S_2$ received at the buffer module 100 in response to a portion of the flow control signal 170 indicating that data signal $S_2$ should be delayed for a specified period of time. Specifically, the buffer module 100 can be configured to store (e.g. hold) one or more portions of the data signal $S_2$ until the buffer module 100 receives an indicator (e.g., a portion of flow control signal 170) that data signal $S_2$ should no longer be delayed. Accordingly, the bit rate of the data signal $S_2$ transmitted into the input side 180 of the buffer module 100 will be different (e.g., substantially different) than the bit rate of the data signal $S_2$ transmitted from the output side 185 of the buffer module 100. More details related to data signal delays at the buffer module 100 are described in connection with FIG. 1B.

Figure 1B:
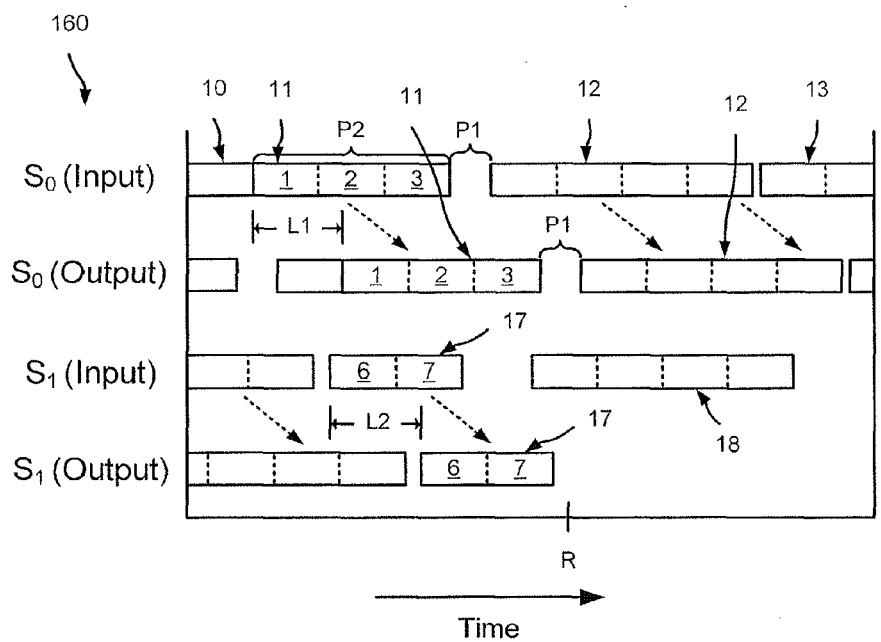
FIG. 1B is a schematic graph that illustrates a portion of the data signals processed at the buffer module shown in FIG. 1A, according to an embodiment.

FIG. 1B is a schematic graph that illustrates a portion of the data signals 160 processed at the buffer module 100 shown in FIG. 1A, according to an embodiment. The graph illustrates streams of variable-sized cells that define data signal $S_0$ and data signal $S_1$ (on the y-axis) versus time (on the x-axis). FIG. 1B illustrates data signal $S_0$ on the input side and the output side of the buffer module 100, and data signal $S_1$ on the input side and the output side of the buffer module 100. In some embodiments, the buffer module 100 can be configured to process a few data signals 160 or many data signals 160 (e.g., 12 data signals, 64 data signals, hundreds of data signals).

As shown in FIG. 1B, data signal $S_0$ and data signal $S_1$ are defined by streams of variable-sized cells. The portion of data signal $S_0$ shown in FIG. 1B is defined by cell 10, cell 11, cell 12, and cell 13. Data signal $S_1$ is defined at least in part by cell 17 and cell 18. As shown in FIG. 1B, the bit-wise width of, for example, cell 11 is different than the bit-wise width of cell 12. In some embodiments, the variable-sized cells can have a specified range of bit-wise widths. For example, the bit-wise widths of the variable-sized cells can be between 64-bytes and 128-bytes in 8-byte increments. In some embodiments, the buffer module 100 can be configured to process cells having fixed bit-wise widths and/or packets of data that have a format other than a cell format (e.g., data having an Ethernet packet format). More details related to variable-sized cells are discussed in connection with FIG. 3.

As shown in FIG. 1B, the cells have segments and processing of the data signals 160 at the buffer module 100 can be based on the segments. For example, cell 11 of the data signal $S_0$ has three segments: segment 1, segment 2, and segment 3. Similarly, cell 17 of data signal $S_1$ has, for example, two segments: segment 6, and segment 7. In some embodiments, a segment at the beginning of a cell can be referred to as a leading segment. For example, segment 1, which is at the beginning of the cell 11, can be referred to as a leading segment. Segments behind the leading segment, such as segment 2 and segment 3, which are behind the leading segment (segment 1) in cell 11, can be referred to as trailing segments.

In some embodiments, the segments of the cells can be processed through various memory banks (e.g., static random-access memory (SRAM) memory banks) included in the buffer module 100 during a distribution process. The memory banks can define a shared memory buffer. In some embodiments, the segments of the data signals can be distributed to memory banks in a predefined fashion (e.g., in a predefined pattern, in accordance with a predefined algorithm) during the distribution process. For example, in some embodiments, the leading segments of the data signals 160 can be processed at portions of the buffer module 100 (e.g., specified memory banks of the buffer module 100) that can be different than portions where the trailing segments are processed within the buffer module 100. In some embodiments, the segments of the data signals 160 can be processed in a particular order. In some embodiments, for example, each of the segments of the data signals 160 can be processed based on their respective positions within a cell. After the segments of the cells have been processed through the shared memory buffer, the segments of the cells can be ordered and sent from the buffer module 100 during a reassembly process. More details related to segment processing are described in connection with FIGS. 2 through 7.

In some embodiments, the data signals 160 can be parsed into segments by a segment module (not shown). In some embodiments, the segment module can be included in (e.g., integrated within) the buffer module 100 shown in FIG. 1A. In some embodiments, the segment module can be disposed outside of the buffer module 100. For example, if the buffer module 100 is included within a middle stage of a multi-stage switch fabric (not shown in FIG. 1A), the segment module can be at an entry stage of the multi-stage switch fabric.

As shown in FIG. 1B, the data signal $S_0$ is time-shifted a time period L1 as the data signal $S_0$ is processed through the buffer module 100. The time-shifting shown in FIG. 1B can be caused by substantially only processing latency through one or more portions of the buffer module 100. Accordingly, as shown in FIG. 1B, a time period P1 between cell 11 and cell 12 is substantially the same on the input side of the buffer module 100 as on the output side of the buffer module 100. The data signal $S_1$ is time-shifted a substantially constant number of clock cycles, and the bit rate of the data signal $S_1$ when transmitted into the input side of the buffer module 100 is substantially the same as the bit rate of the data signal $S_1$ when transmitted from output side of the buffer module 100.

The processing latency that results in the time-shifting time period L1 can be shorter than, for example, a processing time period P2 associated with cell 11. In some embodiments, processing can be performed at the buffer module 100 so that processing latency through the buffer module 100 is smaller than or larger than a processing time period associated with a cell.

As shown in FIG. 1B, cell 17 of data signal $S_1$ is time-shifted a time period L2 based on processing latency through the buffer module 100, and cell 18 of data signal $S_1$ is delayed so that cell 18 is not transmitted from the output side 185 of the buffer module 100 within the time frame shown in FIG. 1B. Specifically, the buffer module 100 is configured to store (e.g., hold) cell 18 (and not transmit cell 18) for a period of time in response to a portion of the flow control signal 170 (not shown in FIG. 1B) received at time R. In some embodiments, the delay can be triggered by the flow control signal 170 (shown in FIG. 1A) in response to congestion in a module downstream from the buffer module 100.

Although not shown, in some embodiments, the buffer module 100 can be configured to transmit cell 18 from the buffer module 100. The cell 18 can be transmitted from the buffer module 100 after the cell 18 is stored (e.g., held) for a period of time at the buffer module 100. In some embodiments, the buffer module 100 can be configured to transmit the cell 18 from the buffer module 100 in response to a portion of the flow control signal 170.

As shown in FIG. 1B, the time period L1 is substantially equal to the time period L2. In some embodiments, the time period L1 can be different than the time period L2. The difference in time period L1 and time period L2 can be caused by different processing latencies through the buffer module 100. For example, the processing latency associated with data signal $S_1$ can be different than the processing latency associated with data signal $S_0$.

Figure 2:
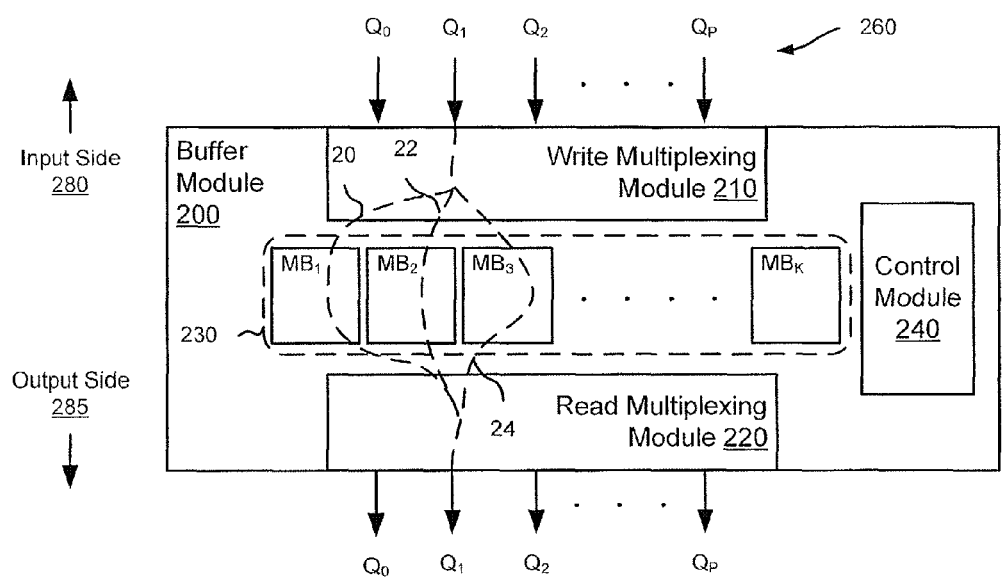
FIG. 2 is a schematic diagram that illustrates a buffer module, according to an embodiment.

FIG. 2 is a schematic diagram that illustrates a buffer module 200, according to an embodiment. As shown in FIG. 2, data signals $Q_0$ through $Q_P$ are received at the buffer module 200 on an input side 280 of the buffer module 200. After processing at the buffer module 200, the data signals $Q_0$ through $Q_P$ are transmitted from the buffer module 200 on an output side 285 of the buffer module 200. Each of the data signals $Q_0$ through $Q_P$ can define a channel (also can be referred to as a data channel). The data signals $Q_0$ through $Q_P$ can collectively be referred to as data signals 260.

The buffer module 200 has a shared memory buffer that is defined by memory banks 230. The memory banks 230 include memory banks $MB_1$ through $MB_K$. In some embodiments, each memory bank from the memory banks 230 can be, for example, an SRAM memory bank, a flash memory bank, and/or so forth. Each of the memory banks 230 can be exclusive (e.g., mutually exclusive) memory banks 230. For example, in some embodiments, each memory bank from the memory banks 230 can be associated with (e.g., can have) one or more memory controllers (not shown). For example, a memory controller associated with memory bank $MB_3$ can be configured to determine a location (e.g., a row, a column, a paginated portion) where information should be written to and/or read from memory bank $MB_3$. In addition, the memory controller can manage pointers to the locations. In some embodiments, even though each of the memory banks 230 can be exclusive (e.g., mutually exclusive) memory banks 230, the memory banks 230 can collectively define a shared memory buffer (e.g., a shared cut-through buffer).

In some embodiments, one or more of the memory banks 230 can have portions allocated to processing (e.g., storing) specified data signals 260 and/or specified portions of the data signals 260. For example, memory bank $MB_1$ can have a first portion allocated to reading and/or writing portions of data signal $Q_0$ and a second portion allocated to reading and/or writing portions of data signal $Q_1$. In some embodiments, the portions can be allocated dynamically as the data signals are received. In some embodiments, for example, memory bank $MB_1$ can have a first portion allocated to reading and/or writing leading segments of data signal $Q_0$ and memory bank $MB_2$ can have a first portion allocated to reading and/or writing trailing segments of data signal $Q_0$ that, for example, directly follow the leading segments of data signal $Q_0$.

As shown in FIG. 2, the buffer module 200 has a write multiplexing module 210 and a read multiplexing module 220. The write multiplexing module 210 and the read multiplexing module 220 are configured to process the segments of the data signals 260 so that one or more segments of the data signals 260 can be processed in parallel (e.g., processed simultaneously) through one or more of the memory banks 230.

Segments of the data signals 260 can be distributed to the memory banks 230 by the write multiplexing module 210, for example, for parallel processing. This process can be referred to as distribution (e.g., segment distribution). As shown in FIG. 2, for example, several segments (e.g., portions) of data signal $Q_1$ are distributed to and transmitted (e.g., routed) through different memory banks of the shared memory buffer 230 by the write multiplexing module 210. Specifically, a first segment of data signal $Q_1$ is transmitted to memory bank $MB_1$ via transmission path 20 by the write multiplexing module 210, a second segment of data signal $Q_1$ is transmitted to memory bank $MB_2$ via transmission path 22 by the write multiplexing module 210, and a third segment of data signal $Q_1$ is transmitted to memory bank $MB_3$ via transmission path 24 by the write multiplexing module 210. In some embodiments, segments of the data signal $Q_1$ can be associated with, for example, a single cell.

After the segments of the data signals 260 have been processed at (e.g., received at, stored at) the memory banks 230, the segments of the data signals 260 are received at (e.g., selected by an received at) the read multiplexing module 220 and ordered before being sent from the buffer module 200. This process can be referred to as reassembly (e.g., segment reassembly) and/or reordering (e.g., segment reordering). As shown in FIG. 2, for example, the segments of data signal $Q_1$ are received at the read multiplexing module 220 via transmission paths 20, 22, and 24. The segments are ordered and sent from the output side 285 of the buffer module 200 as data signal $Q_1$.

In this embodiment, the data signals are processed by the write multiplexing module 210, the read multiplexing module 220, and the memory banks 230 so that segments of each of the data signals 260 on the input side 280 of the buffer module 200 have the same or substantially the same order as the order of the segments of each of the data signals 260 on the output side 285 of the buffer module 200. Although not shown, segments of the other data signals 260 such as data signal $Q_2$ can be processed through the buffer module 200 in a fashion similar to the processing of data signal $Q_1$ shown in FIG. 2.

In some embodiments, the segments of the data signals 260 can be distributed to memory banks 230 by the write multiplexing module 210 in accordance with a predefined methodology (e.g., in a predefined pattern, in accordance with a predefined algorithm) so that the order of the segments of the data signals 260 can be determined by the read multiplexing module 220 based on the predefined methodology. For example, in some embodiments, leading segments from the data signals 260 can be distributed to a memory bank (from the memory banks 230) selected (e.g., designated) to process (e.g., to store) leading segments. The memory bank selected to process leading segments can be referred to as a leading memory bank. Trailing segments from the data signals 260 (i.e., segments trailing the leading segments) can be distributed in order of receipt time in, for example, a round-robin fashion to other memory banks (from the memory banks 230) different from the leading memory bank. The memory banks configured to process trailing segments can be referred to as trailing memory banks. In some embodiments, each of the segments (e.g., leading segment and trailing segments) of a cell can be written to mutually exclusive memory banks from the memory banks 230. In other words, each of the segments can be written to a different memory bank from the memory banks.

The read multiplexing module 220 can be configured to reassemble the segments associated with the data signals 260 and send (e.g., transmit) the data signals 260 from the buffer module 200. The reassembly process can be defined based on the predefined methodology used to distribute segments to the memory banks 230. For example, the read multiplexing module 220 can be configured to first read a leading segment associated with a cell from the leading memory bank, and then read the trailing segments associated with the cell from the trailing memory banks in a round-robin fashion (because the segments were written in a round-robin fashion). Accordingly, very few control signals, if any, need to be transmitted between the write multiplexing module 210 and the read multiplexing module 220. More details related to distribution and reassembly are described in connection with FIGS. 6 and 7.

In this embodiment, processing at the buffer module 200 (e.g., the write multiplexing module 210, the read multiplexing module 220) can be controlled by (e.g., can be triggered by) the control module 240. In some embodiments, functionality associated with the write multiplexing module 210, functionality associated with the read multiplexing module 220, and/or functionality associated with the memory banks 230 can be triggered by one or more control signals from the control module 240. In some embodiments, the control module 240 can be configured to modify a bit rate of one or more of the data signals 260 based on a flow control signal (not shown in FIG. 2). If the buffer module 200 is included in a stage of a multi-stage switch fabric (not shown in FIG. 2), the flow control signal can be received from, for example, a downstream stage of the multi-stage switch fabric. More details related to a buffer module in a switch fabric are described in connection with FIG. 4.

Figure 3:
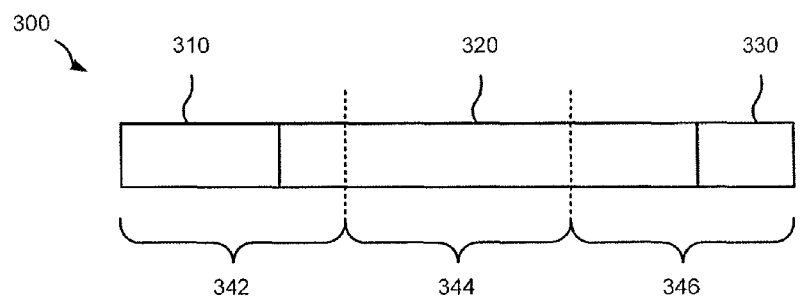
FIG. 3 is a schematic diagram that illustrates portions of a cell that can be included in segments, according to an embodiment.

FIG. 3 is a schematic diagram that illustrates portions of a cell 300 that can be included in segments, according to an embodiment. As shown in FIG. 3, the cell 300 includes a header 310, a payload 320, and a trailer 330. In some embodiments, the cell 300 can include bit values that correspond with, for example, a portion of an Ethernet packet, a session control protocol packet, and so forth. In some embodiments, the cell 300 can include a sequence of bit values corresponding with a protocol associated with any layer (e.g., layer-2, layer-3) of the open systems interconnection (OSI) model.

In some embodiments, the cell 300 can have a bit-wise width within a range of bit-wise widths associated with variable-sized cells. For example, the cell 300 can be a 72-byte cell that can be processed by, for example, a switch fabric. The switch fabric can be configured to process cells that having bit-wise widths between, for example, 48-bytes and 192-bytes.

As shown in FIG. 3 the cell 300 is parsed into three different portions: portion 342, portion 344, and portion 346. As shown in FIG. 3, for example, portion 342 includes the entire header 310 of the cell 300 and a portion of the payload 320 of the cell 300. Portion 346 includes the entire trailer 330 and a different portion of the payload 320 (than included in portion 342).

In some embodiments, the portions of the cell 300 can be included in segments that can be processed at a buffer module such as those described herein (e.g., described in connection with FIG. 1 and FIG. 2). In some embodiments, the segments can include information that can be used to process the segments at the buffer module. For example, one or more segments can include, for example, a header and/or a trailer. The information can be related to an order of a segment with respect to other segments, a length of the segment, a number of segments defined based on the cell 300 (or packet), and so forth. In some embodiments, even though the segments can include information such as a header and/or a trailer, the segment can be substantially unrouteable within a network (e.g., an Internet Protocol (IP) network) outside of a buffer module. In other words, the segment can include information related to processing within the buffer module but may not include information that can be used outside of the buffer module (e.g., not include information that can be used for layer-2 routing outside of the buffer module).

In this embodiment, each of the portions of the cell 300 have an equal bit-wise width or an unequal bit-wise width. In some embodiments, segments defined based on the portions of the cell 300 can have an equal bit-wise width or an unequal bit-wise width. In some embodiments, segments defined based on portions having unequal bit-wise widths can be padded so that the segments have equal bit-wise widths. In some embodiments, the segments defined based on the portions of the cell 300 can have bit-wise widths that are smaller than a minimum bit-wise width of a cell that can be processed within, for example, a switch fabric. In some embodiments, the segments defined based on the portions of the cell 300 can be referred to as flits.

Figure 4:
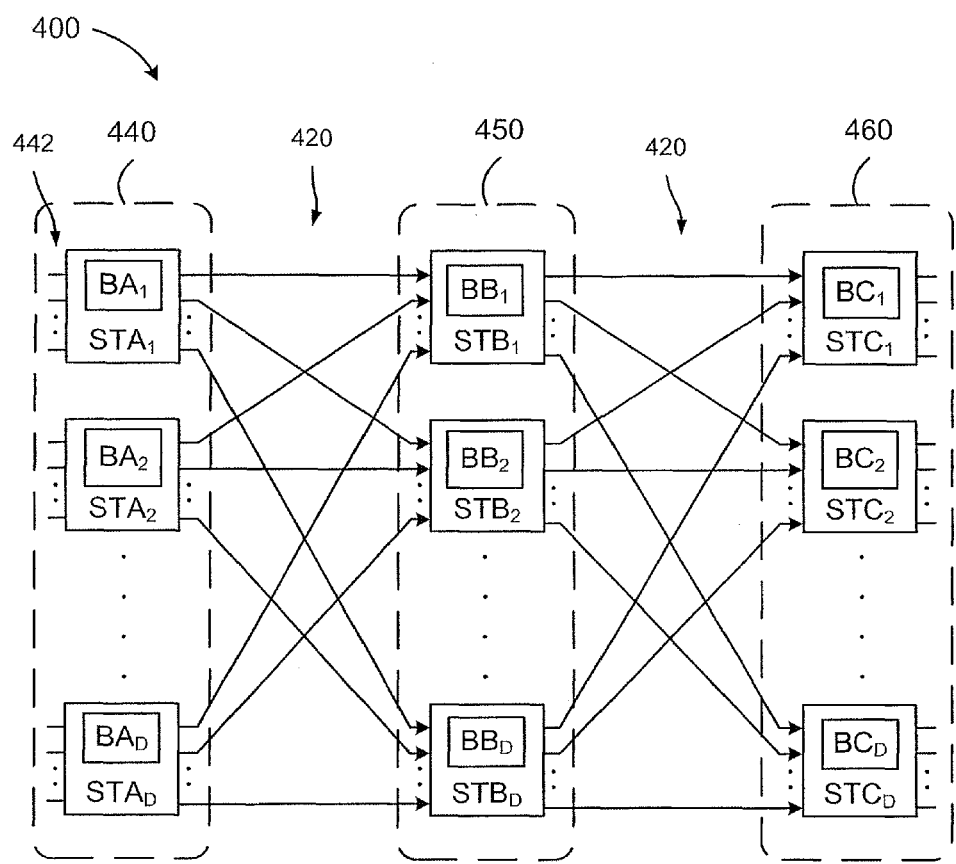
FIG. 4 is a schematic diagram that illustrates a switch fabric that includes buffer modules, according to an embodiment.

FIG. 4 is a schematic diagram that illustrates a switch fabric 400 that includes buffer modules, according to an embodiment. As shown in FIG. 4, switch fabric 400 is a three-stage, non-blocking Clos network and includes a first stage 440, a second stage 450, and a third stage 460. Each the stages of the switch fabric 400 can be defined by an assembly of electronic components and circuitry. In some embodiments, each module can be an assembly of discrete electrical components. In this embodiment, the first stage 440 includes at least modules $STA_1$ through $STA_D$, and buffer modules $BA_1$ through $BA_D$, the second stage 450 includes at least modules $STB_1$ through $STB_D$, and buffer modules $BB_1$ through $BB_D$, and the third stage 460 includes at least modules $STC_1$ through $STC_D$, and buffer modules $BC_1$ through $BC_D$. In some embodiments, for example, each module can be an application-specific integrated circuit (ASIC). In some embodiments, multiple modules can be included in a single ASIC or a single chip package.

In some embodiments, each of the modules (e.g., module $STC_2$) from the stages of the switch fabric 400 can be a cell switch. The cell switches can be configured to redirect cells as they flow through the switch fabric 400. In some embodiments, for example, each cell switch can have multiple input ports, and each cell switch can be operatively coupled to input ports (e.g., write interfaces) of the buffer modules (e.g., also can be referred to as memory buffers in some embodiments). Similarly, each of the cell switches can have a set of output ports, and each of the cell switches can be operatively coupled to output ports (e.g., read interfaces) of the buffer modules. In some embodiments, the buffer modules can be a shared memory buffer implemented using on-chip SRAM. In some embodiments, buffer modules can be configured to provide desirable bandwidth for one or more input ports (e.g., all input ports) of the cell switch to write at least one incoming cell (e.g., a portion of a data packet) per time period (e.g., one or more clock cycles) and one or more output ports (e.g., all output ports) of the cell switch to read at least one outgoing cell per time period. In some embodiments, each cell switch can be configured to operate similar to a crossbar switch that can be reconfigured during each time period.

In some embodiments, each of the modules of the stages of the switch fabric 400 can include a crossbar switch having input bars and output bars. Multiple switches within the crossbar switch can be configured to connect to each input bar with each output bar. When a switch within the crossbar switch is in an "on" position, the input can be operatively coupled to the output bar and data can flow. Alternatively, when a switch within the crossbar switch is in an "off" position, the input is not operatively coupled to the output and data cannot flow. Thus, the switches within the crossbar switch control which input bars are operatively coupled to which output bars.

In some embodiments, each module of the first stage 440 can include a set of input ports 442 configured to receive data (e.g., a signal, a cell of a packet, etc.) as it enters the switch fabric 400. In some embodiments, each module of the first stage 440 can include an equal number of input ports 442.

Data paths 420 between the modules of the stages of the switch fabric 400 can be constructed in any manner configured to facilitate data transfer from the modules of the first stage 440 to the modules of the second stage 442, and from the modules of the second stage 450 to the modules of the third stage 460. In some embodiments, for example, the data paths 420 can be optical connectors between the modules. In some embodiments, the data paths 420 can be included in a midplane. In some embodiments, two or more modules can be contained within a single chip package and the data paths 420 can be electrical traces.

A flow rate of cells through, for example, buffer module $BA_2$ of the first stage 440 can be modified by buffer module $BA_2$ in response to congestion at, for example, one of the modules of the second stage 450 (e.g., module $STB_2$ of the second stage 450). More details related to flow control signals between stages of a switch fabric are set forth in patent application Ser. No. 12/345,490, filed Dec. 29, 2008, entitled, "Flow-Control in a Switch Fabric," which is incorporated herein by reference in its entirety.

Figure 5:
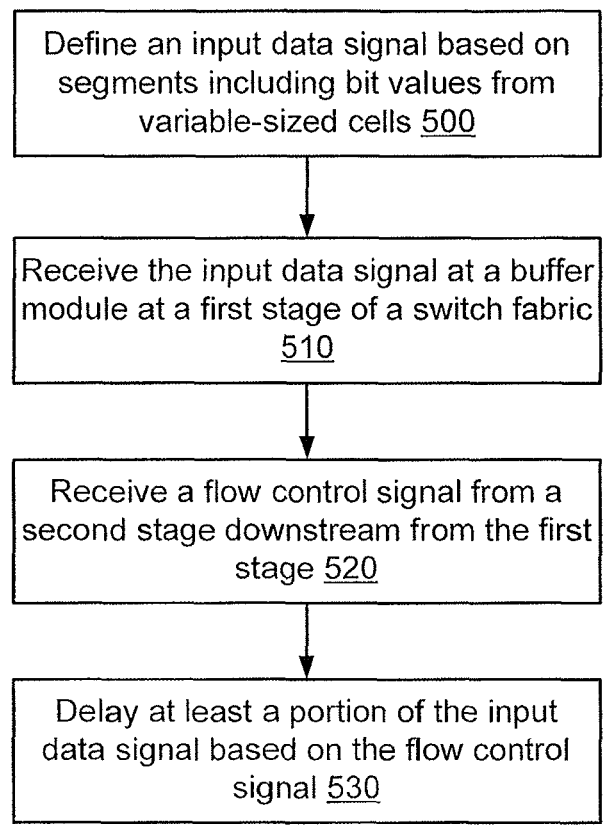
FIG. 5 is a flowchart that illustrates a method for modifying a bit rate of a data signal, according to an embodiment.

FIG. 5 is a flowchart that illustrates a method for modifying a bit rate of a data signal, according to an embodiment. As shown in FIG. 5, an input data signal is defined based on segments including bit values from variable-sized cells, at 500. In some embodiments, the bit values can correspond with, for example, bit values included in a Ethernet packet. In some embodiments, the segments of the input data signal can be defined by a segment module.

The input data signal is received at a buffer module at a first stage of a switch fabric, at 510. In some embodiments, the switch fabric can be defined based on a Clos architecture. In some embodiments, the switch fabric can define at least a portion of a core portion of a data center having multiple edge devices connected to the periphery of the core portion. In some embodiments, the switch fabric can be configured to transmit data in substantially one direction as a unidirectional switch fabric (rather than as a bidirectional switch fabric).

A flow control signal is received from a second stage of the switch fabric downstream from the first stage, at 520. In some embodiments, the flow control signal can be defined based on data congestion at the second stage (e.g., at a module of the second stage) of the switch fabric. In some embodiments, the first stage and the second stage can be adjacent stages anywhere within the switch fabric. For example, the first stage and the second stage can be middle stages within a multi-stage switch fabric. In some embodiments, for example, the second stage can be an egress stage and the first stage can be a middle stage within the switch fabric.

At least a portion of the input data signal is delayed based on the flow control signal, at 530. For example, in some embodiments, one or more portions (e.g., segments) of the input data signal can be stored at the buffer module for a specified period of time based on the flow control signal. Accordingly, although the input data signal may be received at the buffer module, the data signal may not be transmitted from the buffer module for the specified period of time. In some embodiments, delaying the input data signal based on the flow control signal can result in a change in the bit rate of the data signal through the buffer module.

Figure 6A:
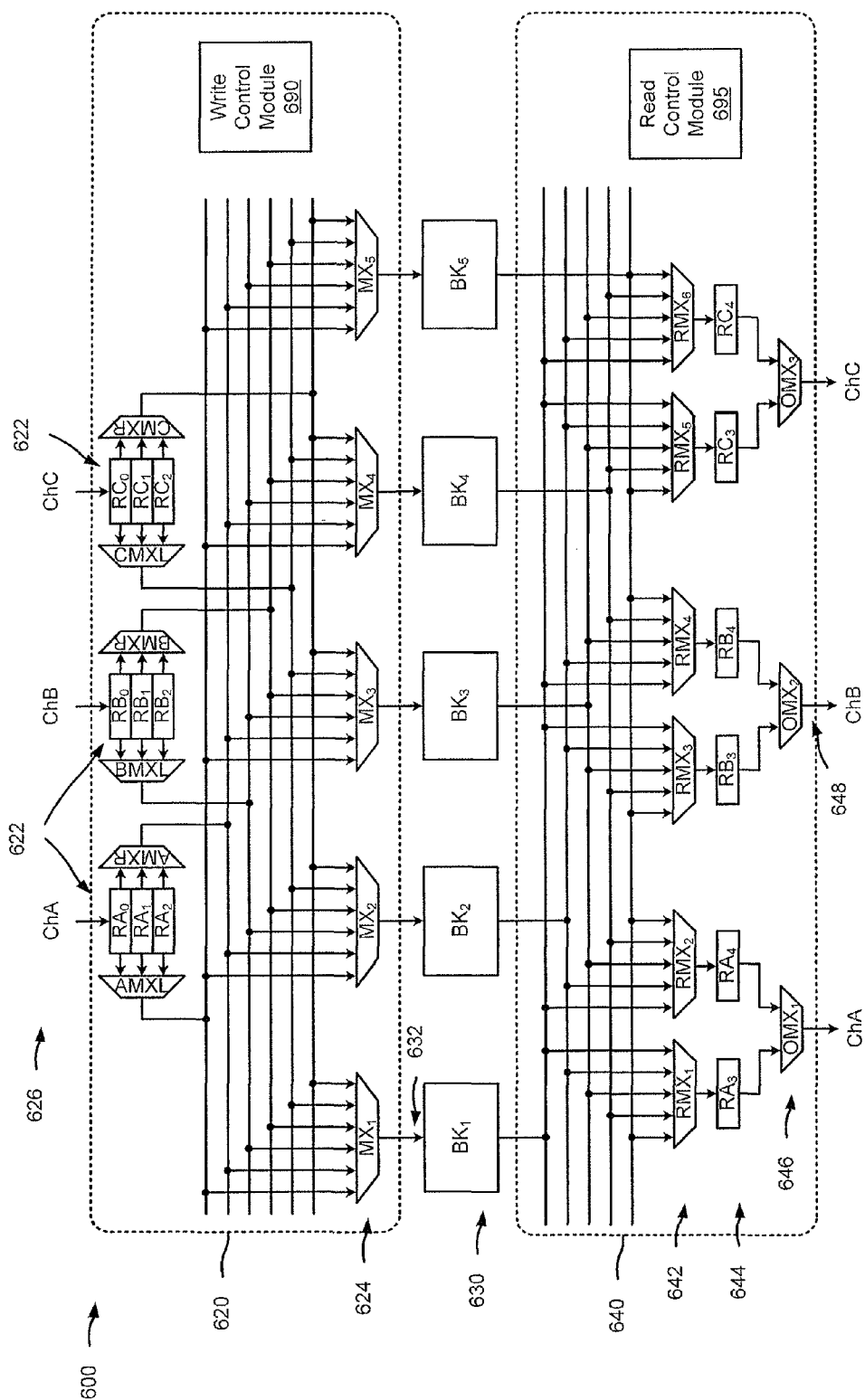
FIG. 6A is a schematic diagram that illustrates components of a buffer module, according to an embodiment.

FIG. 6A is a schematic diagram that illustrates components of a buffer module 600, according to an embodiment. As shown in FIG. 6A, the buffer module 600 includes several memory banks 630 that can define a shared memory buffer, a write multiplexing module 620, and a read multiplexing module 640. The functionality of the write multiplexing module 620 is controlled by (e.g., triggered by) a write control module 690 and the functionality of the read multiplexing module 640 is controlled by (e.g., triggered by) a read control module 695. In some embodiments, the functionality of the write control module 690 and the functionality of the read control module 695 can be combined into a single module (e.g., a single control module) or divided into several modules different than those shown in FIG. 6A.

In some embodiments, each memory bank from the memory banks 630 can be associated with (e.g., can have) one or more memory controllers (not shown). For example, a memory controller associated with (e.g., associated exclusively with) memory bank $BK_1$ can be configured to determine a location (e.g., a row, a column, a paginated portion) where information should be written to and/or read from memory bank $BK_1$.

In this embodiment, the write multiplexing module 620 is configured to receive three input channels: channel ChA, channel ChB, and channel ChC. The input channels are defined by segments that include portions of variable-sized cells. In this embodiment, the write multiplexing module 620 is configured to receive three channels: channel A, channel B, and channel C. The channels are defined by segments that include portions of variable-sized cells that are within a range of bit-wise widths. In this embodiment, the segments have a bit-wise width that are smaller than a minimum bit-wise width of the range of bit-wise widths. In some embodiments, the variable-sized cells can include, for example, one or more portions of data packets. In some embodiments, the buffer module 600 can be configured to receive more channels than those shown in FIG. 6A.

Figure 6B:
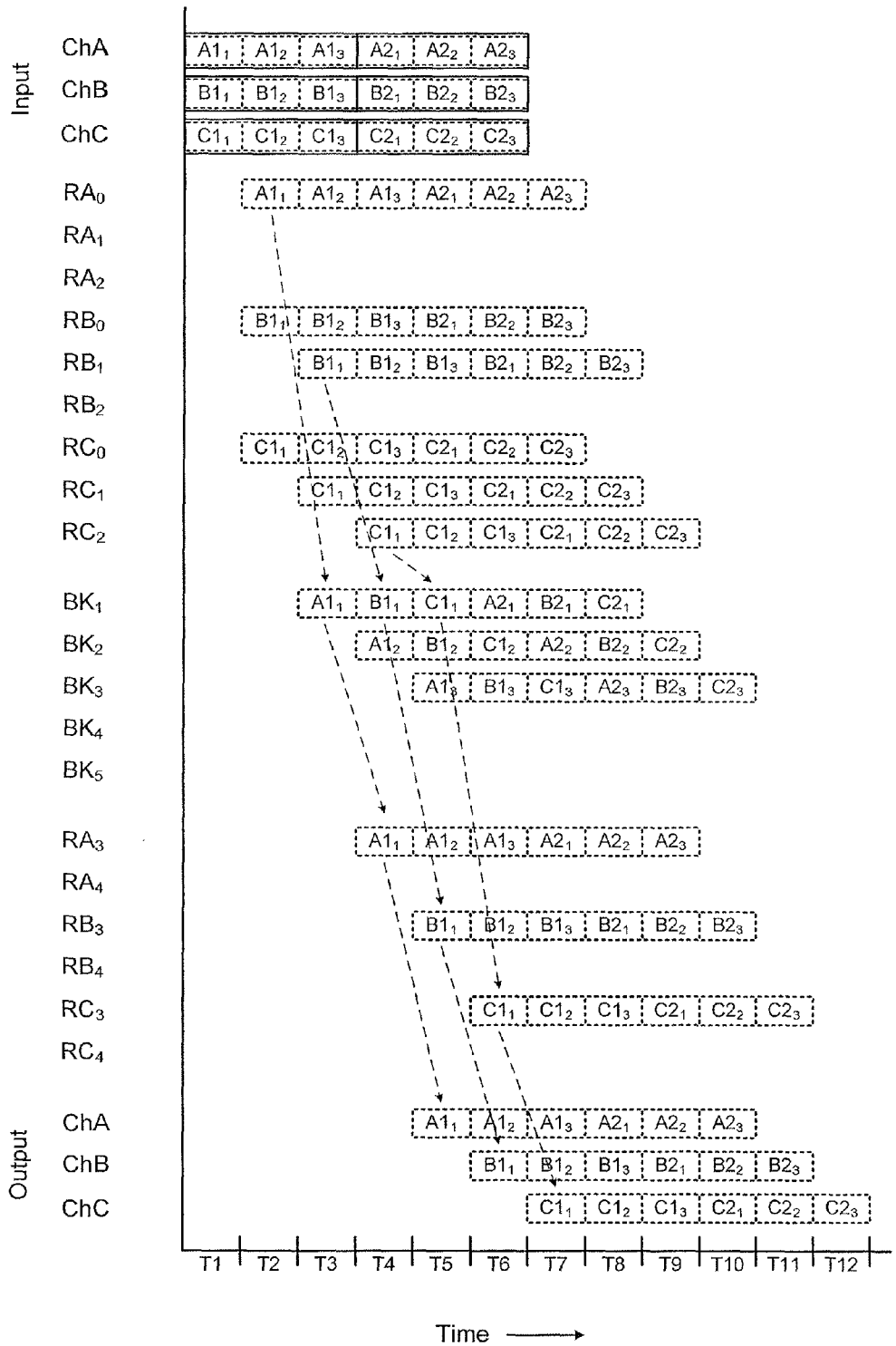
FIG. 6B is a timing diagram that illustrates processing of segments through the components of the buffer module shown in FIG. 6A, according to an embodiment.

FIG. 6B is a timing diagram that illustrates processing of segments through the components of the buffer module 600 shown in FIG. 6A, according to an embodiment. As shown in FIG. 6B, time is increasing to the right on the x-axis starting with time period T1. In some embodiments, the time period T1 can represent a clock cycle or several clock cycles. In some embodiments, the time periods can be referred to as time slots. Several of the components of the buffer module 600 are shown on the y-axis.

In this embodiment, cells of equal bit-wise widths are received at each of the channels. In this embodiment, cells are labeled based on the channel at which they are received, and segments of the cells are labeled with subscripts. For example, Channel ChA is configured to receive cell A1 with three segments: segment $A1_1$, segment $A1_2$, and segment $A1_3$. The segment $A1_1$ is a leading segment of cell A1 and the segment $A1_2$ and segment $A1_3$ are trailing segments of cell A1.

In this embodiment, the leading segments of cells defining the channels are written to memory bank $BK_1$, which has been selected (e.g., designated, assigned) as a write location of the leading segments. Trailing segments of cells defining the channels are written to memory banks $BK_2$ through $BK_5$ in a round-robin fashion. In some embodiments, the memory bank $BK_1$, which has been selected to receive the leading segments, can be referred to as leading memory bank $BK_1$, and the memory banks $BK_2$ through $BK_5$ can be referred to as trailing memory banks $BK_2$ through $BK_5$.

As shown in FIG. 6B, the leading segment of cell A1 (associated with channel ChA), the leading segment of cell B1 (associated with channel ChB), and the leading segment of cell C1 (associated with channel ChC) are received at input registers 622 of the write multiplexing module 620. Specifically, during time period T2, leading segment $A1_1$ is received at input register $RA_0$, leading segment $B1_1$ is received at input register $RB_0$, and leading segment $C1_1$ is received at input register $RC_0$.

As shown in FIG. 6B, the leading segment $A1_1$ of cell A1 is written to leading memory bank $BK_1$ during time period T3. Specifically, the write control module 690 can be configured to trigger selection of the contents of input register $RA_0$ for writing to the leading memory bank $BK_1$ during time period T3 using multiplexer (mux) AMXL and mux $MX_1$. In some embodiments, the leading segment $A1_1$ can be identified as a leading segment based on, for example, an indicator included in the leading segment $A1_1$ and/or a indicator identifying the end of a preceding cell (and included in a last segment of the preceding cell).

The leading segment $B1_1$ of cell B1 is shifted from input register $RB_0$ to input register $RB_1$ during time period T3 until leading memory bank $BK_1$ is ready to receive leading segment $B1_1$ during time period T4. In other words, the leading segment $B1_1$ is shifted within the input registers 622 until a status of the memory bank $BK_1$ (e.g., a status of a write port 632 of the memory bank $BK_1$) changes from an unavailable status to an available status. The leading segment $B1_1$ cannot be written to leading memory bank $BK_1$ during time period T3 because leading segment $A1_1$ is being written to leading memory bank $BK_1$ during time period T3 (which results in leading memory bank $BK_1$ being unavailable). In addition, the leading segment $B1_1$ is shifted from input register $RB_0$ to input register $RB_1$ during time period T3 so that segment $B1_2$ of cell B1, which is directly behind the leading segment $B1_1$, can be received at input register $RB_0$ at time T3. Similarly, the leading segment $C1_1$ cannot be written to leading memory bank $BK_1$ during time period T3 or time period T4 because leading segment $A1_1$ and leading segment $B1_1$ are being written to leading memory bank $BK_1$ during time period T3 and during time period T4, respectively. The leading segment $C1_1$ is shifted from input register $RC_0$ to input register $RC_2$ through input register $RC_1$ (during time periods T3 and T4) so that the trailing segment $C1_2$ and the trailing segment $C1_3$ can be received at input register $RC_1$ and input register $RC_0$, respectively.

As shown in FIG. 6B, the trailing segments are each written to one of the trailing memory banks in a round-robin fashion. For example, after the leading segment $A1_1$ is written to leading memory bank $BK_1$ (which has been selected to receive leading segments) during time period T3, trailing segment $A1_2$ is written to trailing memory bank $BK_2$ during time period T4 and trailing segment $A1_3$ is written to the trailing memory bank $BK_3$ during time period T5. In this embodiment, the trailing segments can be written to the trailing memory banks during contiguous time periods immediately following the time periods that the leading segments are written to the leading memory bank $BK_1$. Accordingly, the write control module 690 can be configured to trigger writing of the trailing segments to the trailing memory banks in a successive fashion (during successive time periods) after conflicts related to writing leading segments to the leading memory bank (which in this case is memory bank $BK_1$) have been resolved. In some embodiments, the write control module 690 can be configured to trigger writing of the trailing memory banks without determining an availability of one or more write ports of the trailing memory banks. This can be performed because resolving conflicts related to writing leading segments to the leading memory bank (which in this case is memory bank $BK_1$) will ensure that conflicts in the trailing banks will not be encountered. This is ensured because the segments are written to the memory banks 630 in a round-robin fashion (e.g., in a sequential fashion) starting with the lead memory bank $BK_1$.

As shown in FIG. 6B, each of the channels is associated with a set of three input registers. For example, each of the segments that define ChA can be received in input register $RA_0$, input register $RA_1$, and input register $RA_2$. Each set of input registers only includes three input registers because the write multiplexing module is configured to received only three channels. Accordingly, in this embodiment, the leading memory bank $BK_1$ is guaranteed to be available for writing within three time periods. In some embodiments, the number of input registers within each set of input registers would be increased beyond three when the write multiplexing module 620 were configured to receive more than three channels.

As shown in FIG. 6B, leading segment $A1_1$, leading segment $B1_1$, and leading segment $C1_1$ are read from the leading memory bank $BK_1$ into the output registers 644 during successive time periods. Leading segment $A1_1$ is read from the leading memory bank $BK_1$ into output register $RA_3$ at time period T4, leading segment $B1_1$ is read from the leading memory bank $BK_1$ into output register $RB_3$ at time period T5, and leading segment $C1_1$ is read from the leading memory bank $BK_1$ into output register $RC_3$ at time period T6. Specifically, the read control module 695 can be configured to trigger selection of segment $A1_1$ from the leading memory bank $BK_1$ and write segment $A1_1$ to output register $RA_3$ the during time period T4 using demultiplexer (demux) $RMX_1$ (from the demuxes 642). In some embodiments, the read control module 695 can be configured trigger writing of segments from the memory banks 630 to, for example, to output register $RA_4$ rather than output register $RA_3$.

The trailing segments of a particular cell are read from the trailing memory banks (e.g., read in a round-robin fashion) after the leading segment of the cell is read from the leading memory bank $BK_1$. For example, trailing segment $A1_2$ is read from trailing memory bank $BK_2$ into register $RA_3$ during time period T5 after the leading segment $A1_1$ is read from the leading memory bank $BK_1$ during time period T4. Similarly, trailing segment $A1_3$ is read from trailing memory bank $BK_3$ into register $RA_3$ during time period T6 after the leading segment $A1_2$ is read from the trailing memory bank $BK_2$ during time period T5. By reading the segments of cell A1 in this order, the segments of cell A1 can be reassembled and transmitted from the buffer module 600 in order. Because the segments can be read from the memory banks 630 in the same pre-determined order (e.g., round-robin order) that the segments are written to the memory banks 630, the write control module 690 and the read control module 695 can perform (e.g., trigger performance of) writing functions and reading functions, respectively, with very little, or substantially no administrative (e.g., book-keeping) overhead.

The read control module 695 can be configured to trigger reading of segments from the memory banks 630 based on a segment number received from the write control module 690. For example, the read control module 695 can be configured to trigger reading of trailing segment $A1_2$ and trailing segment $A1_3$ from trailing memory bank $BK_2$ and trailing memory bank $BK_3$ based on an indicator that cell A1 includes a total of three segments and/or only two trailing segments. In some embodiments, the read control module 695 can be configured to determine a segment number based on an indicator (e.g., a segment number indicator) included in a leading segment of a cell.

In some embodiments, an indicator of a segment number can be received from the write control module 690 based on a determination by the write control module 690 of the segment number. In some embodiments, the write control module 690 can be configured to determine a segment number based on an indicator (e.g., a segment number indicator) included in a leading segment of a cell. In some embodiments, the write control module 690 can be configured to determine a segment number by counting segments defining a cell as the segments are being written to the memory banks 630.

In some embodiments, a segment number can be transmitted to the write control module 690 and/or the read control module 695 from a segment module (not shown) configured to parse cells into segments. In some embodiments, the segment module can be configured to define the segment number when the cells are parsed into segments. In some embodiments, the segment module can include a segment number in one or more segments when defining the segments from a cell.

In some embodiments, the write control module 690 and/or the read control module 695 can be configured to determine an end of a set of segments that define a cell based on an end of cell indicator included in a trailing segment of the cell (e.g., an end of cell indicator in a last trailing segment of a cell). In some embodiments, a segment module can be configured to include an end of cell indicator in one or more trailing segments when defining the segments of a cell.

As shown in FIG. 6A, the cells defining channel ChA are time shifted from time period T1 to time period T5 based on the processing latency through the buffer module 600. The cells defining channel ChB and channel ChC are similarly time-shifted based on processing latency through the buffer module 600.

In this embodiment, the processing latencies associated with channels are different. For example, cell B1 and cell C1 on the input side of the buffer module 600 are aligned, but on the output side of the buffer module 600, cell B1 and cell C1 are offset by a time period. Although concurrently transmitted from the buffer module 600, the stream of segments defining the cell C1 trails the segments defining the cell B1 by one time period. In this embodiment, the time lag between cell B1 and cell C1 correlates to the time periods during which the leading segments of the cells are written to the leading memory bank $BK_1$.

In this embodiment, the write control module 690 is configured to select (e.g., trigger selection of) leading segments for writing to the memory banks 630 in a round-robin fashion starting with channel ChA, proceeding next with selection of (e.g., triggering selection of) a leading segment from channel ChB, and finally selecting (e.g., triggering selection of) a leading segment from channel ChC. In some embodiments, the write control module 690 can be configured to select leading segments in a different order. Accordingly, if the write control module 690 selects leading segments in a different order, the write control module 690 can be configured to communicate the order to the read control module 695 so that the read control module 695 can trigger reading of the segments in a desirable order.

In some embodiments, a memory bank other than memory bank $BK_1$ can be selected as the leading memory bank. For example, in some embodiments, a different memory bank such as memory bank $BK_2$ (instead of memory bank $BK_1$) can be selected as a leading memory bank. Accordingly, memory bank $BK_1$, memory bank $BK_3$, memory bank $BK_4$, and memory bank $BK_5$ can be configured to function as trailing memory banks. In some embodiments, the write control module 690 and/or the read control module 695 can be configured to dynamically select a memory bank as a leading memory bank. If the leading memory bank is selected by (e.g., designated) the write control module 690, the selected leading memory bank can be communicated to the read control module 695, and vice versa. In some embodiments, a memory bank can be selected (e.g., designated) as a leading memory bank for a specified period of time (e.g., a specified period of time determined based on a counter).

In some embodiments, trailing segments can be written and/or read from the trailing memory banks in any order. The order can be defined by, for example, the write control module 690 and/or the read control module 695. For example, a first trailing segment coterminous with a second trailing segment can be written to a first memory bank and a second memory bank respectively. A third memory bank can be disposed between the first memory bank and the second memory bank. If the distribution pattern is defined by the write control module 690, the distribution pattern can be communicated to the read control module 695, and vice versa.

Figure 6C:
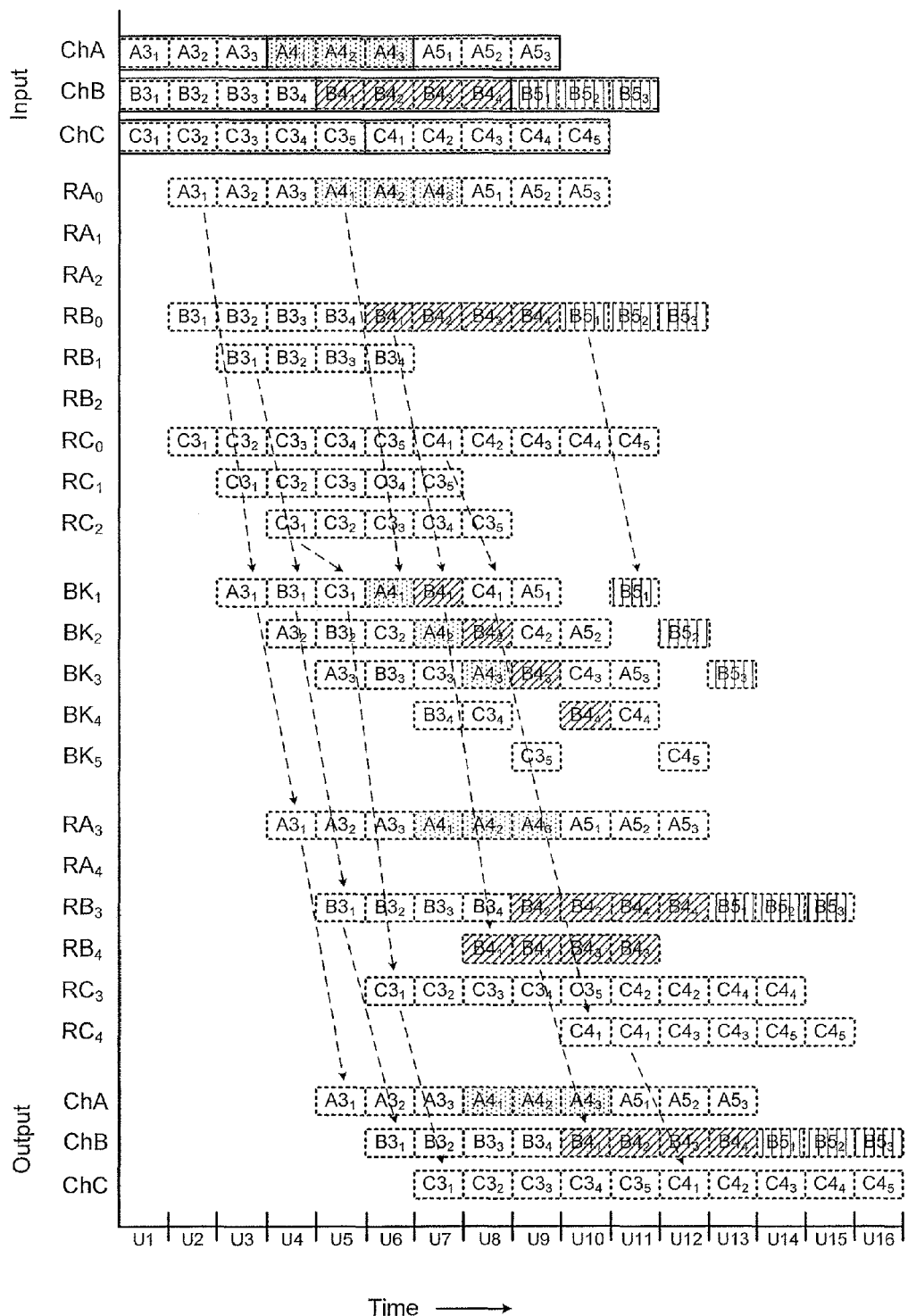
FIG. 6C is a timing diagram that illustrates processing of segments through the components of the buffer module shown in FIG. 6A, according to an embodiment.

FIG. 6C is a timing diagram that illustrates processing of segments through the components of the buffer module 600 shown in FIG. 6A, according to an embodiment. As shown in FIG. 6C, time is increasing to the right on the x-axis starting with time period U1. In some embodiments, the time period U1 can represent a clock cycle or several clock cycles. In some embodiments, the time periods can be referred to as time slots. Several of the components of the buffer module 600 are shown on the y-axis.

In this embodiment, cells are labeled based on the channel at which they are received, and segments of the cells are labeled with subscripts. Also, in this embodiment, cells of variable bit-wise widths are received at each of the channels. For example, Channel ChA is configured to receive cell A3 with three segments: segment A3$_1$, segment A3$_2$, and segment A3$_3$. The segment A3$_1$ is a leading segment of cell A3 and the segments A3$_2$ and segment A3$_3$ are trailing segments of cell A3. Channel ChC is configured to receive cell A5, which has five segments: segment C3$_1$, segment C3$_2$, segment C3$_3$, segment C3$_4$, and segment C3$_5$.

As shown in FIG. 6C, the leading segment of cell A3 (associated with channel ChA), the leading segment of cell B3 (associated with channel ChB), and the leading segment of cell C3 (associated with channel ChC) are received at the input registers 622 of the write multiplexing module 620. Specifically, during time period U2, leading segment A3$_1$ is received at input register RA$_0$, leading segment B3$_1$ is received at input register RB$_0$, and leading segment C3$_1$ is received at input register RC$_o$.

As shown in FIG. 6C, the leading segment A3$_1$ of cell A3 is written to leading memory bank BK$_1$ during time period U3. The leading segment B3$_1$ of cell B3 is shifted from input register RB$_0$ to input register RB$_1$ during time period U3 until leading memory bank BK$_1$ is ready to receive leading segment B3$_1$ during time period U4. In other words, the leading segment B3$_1$ is shifted within the input registers 622 until a status of the memory bank BK$_1$ (e.g., a status of a write port of the memory bank BK$_1$) changes from an unavailable status to an available status. The leading segment C3$_1$ is shifted from input register RC$_0$ to input register RC$_2$ through input register RC$_1$ (during time periods U3 and U4) so that the trailing segment C3$_2$ and the trailing segment C3$_3$ can be received at input register RC$_1$ and input register RC$_{O3}$ respectively.

In this embodiment, all of the segments defining cell B3 are written from input register RB$_1$ to the memory banks 630 after the segments are shifted into input register RB$_1$. Because the leading memory bank BK$_1$ is available during time period U7, the segments defining cell B4 are written from input register RB$_0$ (rather than input register RB$_1$) to the memory banks 630 starting with the leading segment B4$_1$, which is shifted into the input register RB$_0$ during time period U6.

As shown in FIG. 6C, a segment is not written to the leading memory bank BK$_1$ during time period U10 because at time period U10 a leading segment is not stored in any of the input registers 622. In other words, the leading memory bank BK$_1$ is idle until a leading segment from at least one of the channels (e.g., channel ChB) is available to be written to the leading memory bank BK$_1$.

In this embodiment, both segment B3$_4$ from cell B3 and segment B4$_1$ from cell B4 are stored in the memory banks 630 and are ready to be read from the memory banks 630 at time U7. At time U8, segment B3$_4$ from cell B3 is stored at output register RB$_3$ and segment B4$_1$ from cell B4 is stored at output register RB$_4$. Because only a single stream of segments associated with channel ChB can be transmitted from an output port 648 of the buffer module 600, segment B3$_4$ is transmitted from the buffer module during time U9 and segment B4$_1$ is held in (e.g., stored in) the output register RB$_4$ during time U9 as shown in FIG. 6C. Specifically, the read control module 695 can be configured to trigger selection of segment B3$_4$ from output register RB$_3$ during time period U9 using demux OMX$_2$ (from demuxes 646). The segment B4$_1$ is transmitted from the buffer module 600 when the output port 648 of the buffer module 600 is available during time U10. In some embodiments, the read control module 695 can be configured to trigger writing of segments from the memory banks 630, for example, primarily to output register RB$_4$ and secondarily to output register RB$_3$.

In some embodiments, the read multiplexing module 640 can have more than two output registers (or less than two registers) per channel. In some embodiments, if an output port associated with a channel (such as output port 648) is unavailable (e.g., in an unavailable state) and/or the output registers associated with a channel are unavailable (e.g., in an unavailable state), the memory banks 630 can be configured to store (e.g., hold) one or more segments for more than one time period until the output port and/or the output registers 644 of the channel become available (e.g., change to an available state). In such instances, the read control module 695 can be configured to trigger storage of the segment(s) at the memory banks 630 until the output port and/or the output registers of the channel become available. An example of the buffer module 600 with more than two output registers per channel is described in connection with FIG. 8.

In this embodiment, the memory banks 630 has five memory banks, which is equal to the maximum number of segments included in a cell. The quantity of the memory banks 630 is equal to the maximum number of segments included in a cell so that each of the segments (e.g., leading segment and trailing segments) of each cell (such as cell C3) can be written to a mutually exclusive memory bank from the memory banks 630. In other words, each of the segments can be written to a different memory bank from the memory banks 630. In some embodiments, memory banks within a buffer module can have more memory banks than a maximum number of segments included in cells to be processed by the buffer module.

Figure 7:
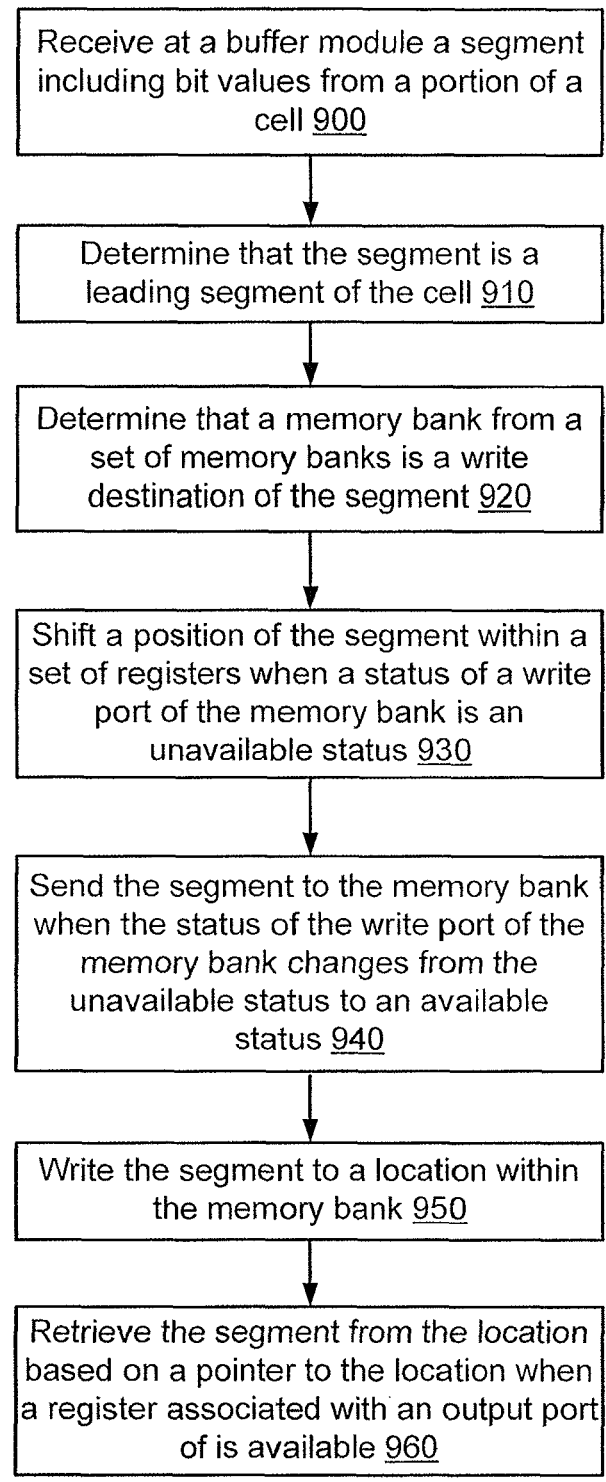
FIG. 7 is a flowchart that illustrates a method for processing a segment at a buffer module, according to an embodiment.

FIG. 7 is a flowchart that illustrates a method for processing a segment at a buffer module, according to an embodiment. As shown in FIG. 7, a segment including bit values from a portion of a cell is received at a buffer module, at 900. In some embodiments, the cell can include bit values corresponding with one or more packets (e.g., Ethernet packets). In some embodiments, the segment can define a portion of a data signal (e.g., a data signal defining a channel). In some embodiments, the buffer module can be included in a stage of a switch fabric.

A determination that the segment is a leading segment of the cell is made, at 910. In some embodiments, the determination can be made based on a indicator included in a portion of the leading segment. In some embodiments, the determination can be made by a write control module such as write control module 690 shown in FIG. 6A.

A determination that a memory bank from a set of memory banks is a write destination of the segment is made, at 920. In some embodiments, the segment can be sent to the memory bank because the memory bank has been selected as a leading memory bank.

A position of the segment within a set of registers is shifted when a status of a write port of the memory bank is an unavailable status, at 930. In some embodiments, the segment can be shifted multiple times within the set of registers. In some embodiments, the set of registers can be included in a write multiplexing module. In some embodiments, the write port of the memory bank can have an unavailable status because a different segment from a different cell is being written to the memory bank via the write port.

The segment is sent to the memory bank when the status of the write port of the memory bank changes from the unavailable status to an available status, at 940. In some embodiments, the segment can be sent to the memory bank via one or more muxes included in a write multiplexing module. The muxes can be controlled by, for example, a write control module.

The segment is written to a location within the memory bank, at 950. In some embodiments, the location within the memory bank can be determined by a memory controller associated with the memory bank.

The segment is retrieved from the location based on a pointer to the location when a register associated with an output port of the buffer module is available, at 960. In some embodiments, the pointer can be determined by a memory controller associated with the memory bank.

Figure 8:
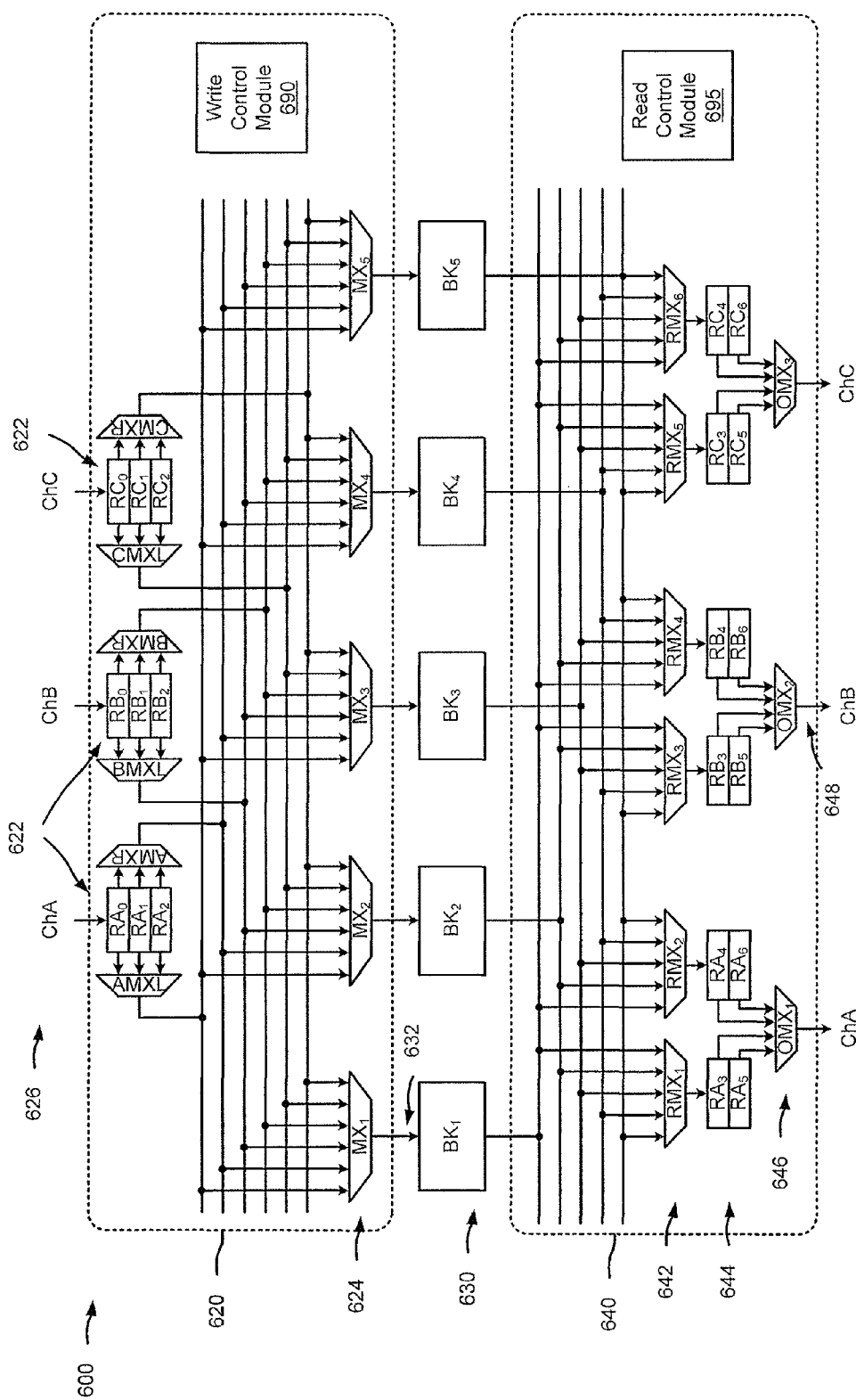
FIG. 8 is a schematic diagram that illustrates a variation of the buffer module shown in FIG. 6A, according to an embodiment.

FIG. 8 is a schematic diagram that illustrates a variation of the buffer module 600 shown in FIG. 6A, according to an embodiment. In this embodiment, the output registers 644 include 4 output registers per output channel (rather than 2 output registers per output channel as shown in FIG. 6A). For example, the output registers 644 associated with the output side of channel ChA (on the output side of the buffer module 600) are output register $RA_3$, output register $RA_4$, output register $RA_5$, and output register $RA_6$. Segments stored in the output registers 644 can be selected for transmission from the buffer module 600 by the output demuxes 646. For example, output demux $OMX_1$ can be triggered by the read control module 695 to select a segment stored in output register $RA_5$ for transmission from the buffer module 600 as at least a portion of output channel ChA.

The additional output registers 644 associated with each channel (compared with the number of output registers 644 shown in FIG. 6A) can enable the read control module 695 to read segments from (e.g., trigger reading of segments from) the memory banks 630 into the output registers 644 without triggering the memory banks 630 to hold segments more than one time period. A segment of a cell read from the memory banks 630 can be shifted within the output registers 644 until an output port associated with a channel (such as output port 648) is available (e.g., in an available state).

For example, a segment of a cell can be read from memory bank $BK_3$ into output register $RB_3$ during a first time period (e.g., one clock cycle) after the segment of the cell is received at the memory bank $BK_3$ (during a previous time period). If the output port 648 associated with output channel ChB is unavailable to transmit the segment from the buffer module 600 during a second time period after the first time period, the segment can be shifted from output register $RB_3$ into output register $RB_5$ during the second time period. If the output port 648 is available during a third time period after the second time period, the segment can be transmitted from the buffer module 600 via the output port 648 during the third time period.

In some embodiments, each channel can be associated with a number of output registers 644 that enables the read control module 695 to read segments from (e.g., trigger reading of segments from) the memory banks 630 during a time period directly after a time period during which the segments are received at the memory banks 630. In other words, unless a flow control signal alters the flow of segments through the memory banks 630, all segments can be stored in the memory banks 630 for less than two time periods. In some embodiments, a minimum number of output registers 644 for each output channel of buffer module 600 can be X+1, where X is the difference between the number of segments in the largest cell to be processed by the buffer module 600 and the number of segments in the smallest cell to be processed by the buffer module 600. For example, if the buffer module 600 is configured to process variable-sized cells that can have minimum of 3 segments and a maximum of 5 segments, the minimum number of output registers 644 for each channel would be 3 (i.e., 5−3+1).

In this embodiment, each of the output channels is associated with two demuxes 642, and each of the demuxes 642 is associated with two output registers 644. Demux $RMX_1$ and its associated output registers 644 (output register $RA_3$ and output register $RA_5$) can be referred to as a left side demux/register of output channel ChA, and demux $RMX_2$ and its associated output registers 644 (output register $RA_4$ and output register $RA_6$) can be referred to as a right side demux/register of output channel ChA. Each of the channels can similarly be associated with a left side demux/register and a right side demux/register. Because each left side demux 642 and each right side demux 642 is associated with an equal number of output registers 644, the sides can be referred to as being balanced.

In this embodiment, the buffer module 600 is configured with balanced left side demux/registers and right side demux/registers to simplify the control strategy used by the read control module 695. For example, if the sides are balanced, the read control module 695 can be configured to trigger segments (from the memory banks 630) to be written to a left side demux/register of an output channel and to a right side demux/register of the output channel in an alternating fashion without tracking the availability of the individual output registers 644.

If the sides of the demux/registers are unbalanced, the control strategy used by the read control module 695 may be more complex than in the balanced demux/registers case. For example, if two output registers 644 are associated with a left side demux 642 of a channel and one output register 644 is associated with a right side demux 642 of a channel, the read control module 695 may be required to determine (e.g., verify) and/or track the availability (e.g., available state) of the one output register 644 associated with the right side demux 642 before triggering writing of segment to the output register 644 associated with the right side demux 642.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as ASICs, Programmable Logic Devices (PLDs), and Read-Only Memory (ROM) and RAM devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, a buffer module can be configured to send segments of a cell directly to another buffer module. In some embodiments, a buffer module can include several stages of shared memory buffers.

What is claimed is:

1. A method, comprising:
   receiving at an input register a cell of an input signal, the input signal including a plurality of cells that includes the cell, the cell including a plurality of segments;
   determining whether a memory bank from a set of memory banks is a write destination of a segment from the plurality of segments when the segment is a leading segment of the cell, the set of memory banks defining at least a portion of a cut-through buffer; and
   modifying a flow rate of the segment through the memory bank in response to a flow control signal received at the input register.

2. The method of claim 1, further comprising:
   writing, in a first time slot, the segment from the input register to a location within the memory bank; and
   retrieving, in a second time slot mutually exclusive from the first time slot, the segment from the location within the memory bank based on an output register associated with the set of memory banks being available during the second time slot such that the segment is included in a cell of an output signal, the cell of the output signal substantially corresponding to the cell of the input signal.

3. The method of claim 1, wherein the input register is a first input register from a set of input registers, the method further comprising:
   storing the segment within the first input register during a first time slot; and
   shifting the segment, at a second time slot mutually exclusive from the first time slot, from the first input register to a second input register from the set of input registers when a status of a write port of the memory bank during the second time slot is an unavailable status.

4. The method of claim 1, further comprising:
   sending the segment from the input register to the memory bank without determining a status of a write port of the memory bank.

5. The method of claim 1, wherein the plurality of segments includes a set of trailing segments mutually exclusive from the leading segment, the memory bank is a first memory bank from the set of memory banks, the method further comprising:
   writing each trailing segment from the set of trailing segments from the input register to a unique memory bank from the set of memory banks different from the first memory bank.

6. The method of claim 1, further comprising:
   writing each segment from the plurality of segments of the cell from the input register to a unique memory bank from the set of memory banks during a different unique time slot from a plurality of time slots.

7. An apparatus, comprising:
   a write multiplexing module including a set of registers, the write multiplexing module configured to receive at a first register from the set of registers a cell including a plurality of segments,
   the write multiplexing module configured to determine that a memory bank from a set of memory banks is a write destination of a segment from the plurality of segments, the write multiplexing module configured to shift the segment from the first register from the set of registers to a second register from the set of registers when a status of a write port of the memory bank is an unavailable status.

8. The apparatus of claim 7, wherein the segment is a leading segment of the cell, the set of memory banks defines at least a portion of a cut-through buffer.

9. The apparatus of claim 7, wherein the cell is from a set of variable-sized cells, each variable-sized cell from the set of variable-sized cells having a bit-wise width within a range of bit-wise widths, each segment from the plurality of segments having a bit-wise width less than a minimum bit-wise width from the range of bit-wise widths.

10. The apparatus of claim 7, wherein the write multiplexing module is configured to send the segment to the memory bank when the status of the write port of the memory bank is an available status.

11. The apparatus of claim 7, wherein the segment is a trailing segment and not a leading segment of the cell.

12. The apparatus of claim 7, wherein the set of memory banks is included in a stage of a multi-stage switch fabric defining at least a core portion of a data center.

13. The apparatus of claim 7, wherein the memory bank is a random access memory bank.

14. The apparatus of claim 7, wherein the cell is associated with a first signal, the status of the write port of the memory bank being the unavailable status when a segment from a cell associated with a second signal is being written to the memory bank.

15. An apparatus, comprising:
   a control module configured to trigger distribution of a set of segments included within a set of variable-sized cells to a set of memory banks within a first stage of a multi-stage switch fabric, each variable-sized cell from the set of variable-sized cells having a bit-wise width within a range of bit-wise widths,
   the control module further configured to modify a flow rate of a stream of segments from the set of segments through the set of memory banks within the first stage of a multi-stage switch fabric in response to receiving a flow control signal from a second stage of the multi-stage switch fabric downstream from the first stage of the multi-stage switch fabric,
   the control module further configured to trigger a segment from the set of segments to be sent to a memory bank from the set of memory banks within the first stage of a multi-stage switch fabric after the memory bank is determined to be a write destination of the segment.

16. The apparatus of claim 15, wherein each segment from the set of segments has a bit-wise width less than a minimum bit-wise width from the range of bit-wise widths associated with the set of variable-sized cells.

17. The apparatus of claim 15, wherein each segment from the set of segments has an equal bit-wise width.

18. The apparatus of claim 15, further comprising:
   a set of input registers configured to store the set of segments before the set of segments are distributed to the set of memory banks by the control module, the set of input registers having a quantity defined based on the range of bit-wise widths.

19. The apparatus of claim 15, wherein the multi-stage switch fabric is defined based on a Clos architecture.

20. The apparatus of claim 15, wherein the multi-stage switch fabric defines at least a core portion of a data center.

* * * * *